Jan. 15, 1935.  T. W. SLUTZ  1,988,342
SHOCK ABSORBING DEVICE
Filed May 24, 1933

INVENTOR.
Thomas W. Slutz
BY
Fay, Oberlin & Fay
ATTORNEYS.

Patented Jan. 15, 1935

1,988,342

UNITED STATES PATENT OFFICE 1,988,342

SHOCK ABSORBING DEVICE

Thomas W. Slutz, Cleveland, Ohio

Application May 24, 1933, Serial No. 672,616

21 Claims. (Cl. 267—34)

This invention relates as indicated to shock absorbing devices and while applicable to be employed in conjunction with any pair of relatively movable objects, the oscillations between which are to be dampened, nevertheless, the invention is particularly applicable as a supporting means for devices such as seats and the like carried on road vehicles.

It is among the objects of my invention to provide a shock absorbing device of the above described character which shall be capable of effectually absorbing vibrations from the body of a vehicle and prevent the same from being transmitted to an article supported by the vehicle, such as a passenger seat.

It is also one of the objects of my invention to provide a shock absorbing device which shall be completely self-contained and which shall require inspection and servicing only at relatively long intervals.

It is a further object of my invention to provide a shock absorbing device capable of heavy duty service but which may be constructed at a very low cost. Other objects of my invention will appear as the description proceeds.

To the accomplishment of the foregoing and related ends, said invention, then consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1:
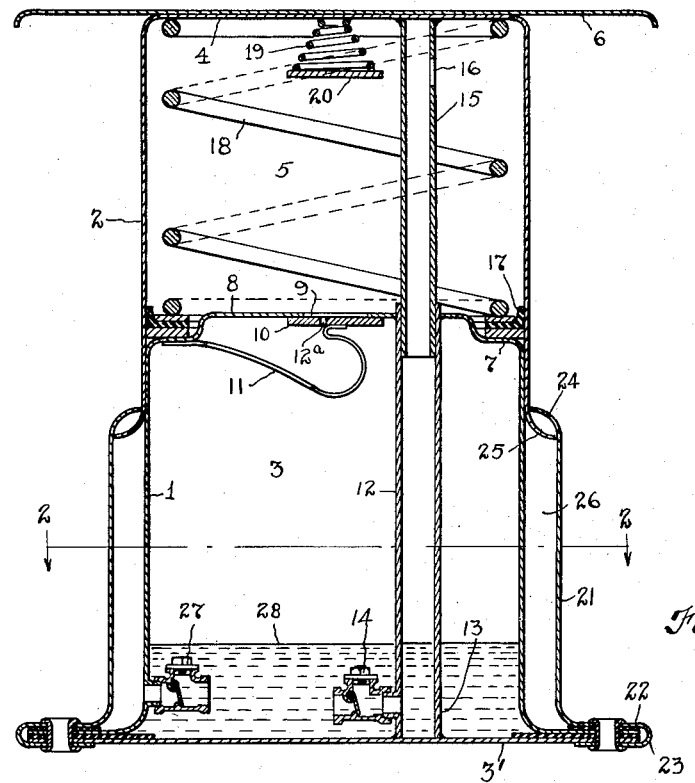
Figure 2:
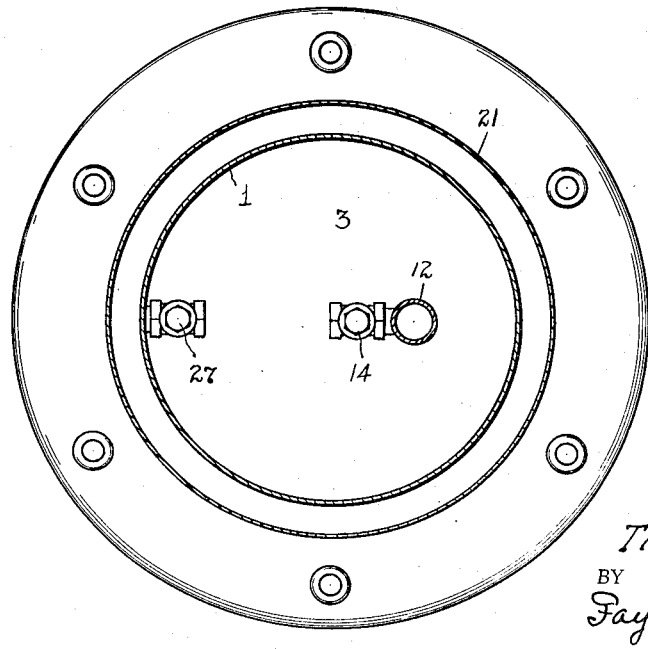

Figure 1 is a vertical section view through an apparatus constructed in accordance with the principles of my invention and Figure 2 is a transverse sectional view of the apparatus illustrated in Figure 1 taken on a plane substantially indicated by the line 2—2.

Referring now more specifically to the drawing and more especially to Figure 1, the apparatus illustrated as constructed in accordance with the principles of my invention consists generally of a piston unit 1 and a cylinder unit 2, such units when in use, respectively secured to the two relatively movable members, the oscillation between which is to be absorbed or dampened by the device comprising my invention.

The piston 1 which is substantially cylindrical in form is, at its lower end, secured to a base plate, generally indicated at 3', the connection between the piston 1 and the plate 3 being preferably fluid-tight so as to provide a closed compartment 3 within the piston.

Telescopically engaging the piston 1 is the cylinder 2 which, at its upper end 4, is closed in order to provide a substantially closed compartment 5. The cylinder 2, at its upper end, may carry a plate 6 to which a vehicle seat or similar device may be secured and by which such seat or device is supported.

The head 7 of the piston 1 is centrally provided with an upwardly extending portion, generally indicated at 8, such portion being provided with an axially extending aperture 9 therethrough. The aperture 9, therefore, provides communication between the chambers 3 and 5. Such aperture is, however, normally closed by means of a valve plate 10 held in sealing engagement about such aperture by some suitable means such as a spring 11. For purposes hereinafter more fully explained, the valve plate 10 has a bleeder opening 12a therethrough extending between the compartments 3 and 5.

Secured in the elevated portion 8 of the piston head and extending therethrough is a tube 12 which, at its lower end 13, is secured in sealing engagement to the base plate 3. At its lower end 13, the tube 12 is provided with a check valve 14 for the purpose hereinafter more fully explained.

The cylinder 2, more particularly, the top plate 4 thereof, has a second tube 15 secured thereto and arranged to telescopically engage the tube 12. The tube 15 should be provided with an aperture 16 in the wall thereof, so that liquid arising in the tube 15 may pass out through such aperture into the compartment 5.

A proper sliding seal between the piston and cylinder may be insured by the employment of a suitable gasket, such as 17, which may be of any common form of construction.

Interposed between the upper end or head of the piston and the end or bottom of the cylinder is a spring 18, which forces the piston and cylinder axially apart. The spring 18 should be strong enough to support the static load placed on the plate 6.

Secured to the upper end 4 of the cylinder 2 is a spring 19, which carries a valve plate 20. When the cylinder 2 is depressed for a distance sufficient to enable the valve plate 20 to engage the head of the piston about the aperture 9, it will be apparent that flow of fluid from the compartment 5 to compartment 3 normally permitted by the spring-supported valve 10 is obstructed.

Surrounding the piston 1 is an annular casing, generally indicated at 21, which, at its lower edge 22, is secured in sealing engagement to the base structure; such engagement may be effected and the several parts held in assembled relation by peening or curling over the edge 23 until it overlaps the edges of the plate 3 and the radial flange of the piston 1.

At its upper edge, the annular member 21 is provided with an inwardly extending flange 24, such flange extending to within a very short distance of the outer periphery of the cylinder 2. The cylinder 2 also has, along its lower edge, an outwardly extending radial flange 25 which cooperates with the flange 24 in preventing the spring 18 from moving the cylinder 2 off from the piston 1. The cooperative action of the flanges 24 and 25 respectively positioned adjacent the cylinder 2 and the annular member 21 also assist in preventing canting of the cylinder and thereby assist in insuring freedom of relative movement between the piston and cylinder.

The primary function of the annular member 21 is, however, to provide an annular chamber 26 in which the leakage past the piston from the chamber 5 will be collected. At its lower end, the chamber 26 has a check valve, generally indicated at 27 associated therewith, which provides one-way flow of liquid from the chamber 26 through the wall of the piston 1 and into the chamber 3.

From the above description of the construction of an apparatus according to the principles of my invention, the operation of such apparatus may be briefly described as follows:—

As previously indicated, the spring 18 should be strong enough to support the static load placed upon the seat carried by the plate 6 or any similar static load supported by such plate. The strength of the spring 18 should be such, however, that when vibration is imparted to either the piston or the cylinder, the spring will be deflected so that such vibrations may be dampened or reduced in the manner now to be explained.

Assuming, therefore, that a static load is supported by the apparatus with the parts in their relative positions as illustrated in Figure 1, any vibration will cause the spring 18 to be compressed and the cylinder 2 to move downwardly over the piston 1. This downward movement compresses the air in the chamber 5, which is immediately vented to the chamber 3 by unseating the valve plate 10. The chamber 3, however, also being a sealed chamber cooperates with the chamber 5 in returning the air originally present therein so that downward movement of the cylinder 2 can only be accomplished by a compression of the air trapped in the two chambers. This compressed air, therefore, assists the spring 18 in arresting relative movement between the piston and cylinder.

When the downward impulse of the cylinder 2 is arrested in the manner just described, a rebound of the parts will be arrested and dampened in the following manner.

As soon as the cylinder starts to move upwardly relatively to the piston 1, the valve plate 10 is immediately closed under the influence of the spring 11. Any continued upward movement of the cylinder 2, therefore, can only be effected against a partial vacuum created in the compartment 5 and it is this partial vacuum which eliminates objectionable rebound.

In order to soften the effect of this partial vacuum in arresting upward return of the cylinder 2, a bleeder orifice 12a may be provided in the valve plate 10, which gradually permits the air previously compressed into the compartment 3 to return to the compartment 5. It should be noted at this point that the orifice 12a may be positioned at any point in the raised boss 7 and need not necessarily be formed in the valve plate.

The piston 1 will, during the normal operation of the illustrated device, be filled with a liquid such as oil to a level, as approximately indicated by the line 28, which is above the level of the check valve 14. When the cylinder 2 moves upwardly creating a partial vacuum in the chamber 5, oil is caused to flow upwardly through the conduit 12 into the chamber 5. This upward flow of oil also assists in dampening the effectiveness of the partial vacuum in the chamber 5, thereby softening the arresting action of such vacuum on the rebound movement of the cylinder 2. The oil which flows upwardly in the tube 12 will be discharged into the chamber 5 as previously indicated through the orifice 16. Oil which so flows into the chamber 5 will return to the chamber 3 immediately, when the valve plate 10 is unseated upon the next downward movement of the cylinder 2. Due to the fact that the boss 8 including the valved opening 9, is above the head of the piston, or more particularly, the gasket associated therewith, such gasket 17 will, therefore, at all times be operating in an oil bath assuring a perfect seal between the piston and the cylinder.

Any leakage of this oil both around the gasket, past the piston into the annular chamber 26 will be returned to the chamber 3 through the check valve 27.

In order to dampen extreme vibrations which might force the head 4 of the cylinder down onto the head of the piston if the valved opening 9 were to remain open during the entire downward travel of the cylinder 2, I provide an auxiliary valve 20 carried by the plate 4, which, as soon as the cylinder approaches the end of its travel, closes the opening 9 and traps a certain amount of air in the compartment 5 to prevent the plate 4 from striking the head of the piston.

Another function of the telescopic members 12 and 15 which has not been referred to hereinbefore is that such members, due to their location eccentrically with respect to the axis of the piston and cylinder, prevent relative rotation between the piston and cylinder and, therefore, maintain the parts in proper relative position which is important when a vehicle seat is supported on the plate 6.

Other modes of applying the principle of my invention may be employed instead of the one explained, change being made as regards the mechanism herein disclosed, provided the means stated by any of the following claims or the equivalent of such stated means be employed.

I, therefore, particularly point out and distinctly claim as my invention:

1. In a shock absorbing device, the combination of substantially vertically arranged relatively movable piston and cylinder elements defining a plurality of closed spaces entrapping gas, spring means normally urging apart said piston and cylinder elements, a valve in the head of said piston establishing communication between said spaces and adapted to pass said gas quickly therebetween in only one direction, and a constricted conduit establishing communication between said spaces in the opposite direction.

2. In a shock absorbing device, the combination of substantially vertically arranged relatively movable piston and cylinder elements defining a plurality of closed spaces entrapping a gas, spring means normally urging apart said piston and cylinder elements, a valve in the head of said piston establishing communication between said spaces and adapted to pass said gas quickly therebetween in only one direction, a quantity of liquid in the lowermost of said spaces, and a constricted conduit extending into said liquid and providing communication between said spaces.

3. In a shock absorbing device, the combination of substantially vertically arranged relatively movable piston and cylinder elements defining a plurality of closed spaces, spring means normally urging apart said piston and cylinder elements, a valve in the head of said piston establishing communication between said spaces in only one direction, a quantity of liquid in the lowermost of said spaces, and a constricted conduit extending into said liquid and providing communication between said spaces in the opposite direction.

4. In a shock absorbing device, the combination of substantially vertically arranged relatively movable piston and cylinder elements defining a plurality of closed spaces, spring means normally urging apart said piston and cylinder elements, a valve in the head of said piston establishing communication between said spaces in only one direction, a quantity of liquid in the lowermost of said spaces, and a telescopic conduit comprising sections respectively carried by said piston and cylinder units and providing communication between said spaces, said section carried by said piston extending into said liquid.

5. In a shock absorbing device, the combination of substantially vertically arranged relatively movable piston and cylinder elements defining a plurality of closed spaces, spring means normally urging apart said piston and cylinder elements, a valve in the head of said piston establishing communication between said spaces in only one direction, and a telescopic conduit comprising sections respectively carried by said piston and cylinder units and providing communication between said spaces in the opposite direction.

6. In a shock absorbing device, the combination of substantially vertically arranged relatively movable piston and cylinder elements defining a plurality of closed spaces, spring means normally urging apart said piston and cylinder elements, a valve in the head of said piston establishing communication between said spaces in only one direction, a quantity of liquid in the lowermost of said spaces, and a telescopic conduit comprising sections respectively carried by said piston and cylinder units, said conduit providing communication between said spaces and extending to below the level of said liquid.

7. In a shock absorbing device, the combination of substantially vertically arranged relatively movable piston and cylinder elements defining a plurality of closed spaces, spring means normally urging apart said piston and cylinder elements, a valve in the head of said piston establishing communication between said spaces in only one direction, a quantity of liquid in the lowermost of said spaces, and a telescopic conduit comprising sections respectively carried by said piston and cylinder units, said conduit providing communication between said spaces in the opposite direction and extending to below the level of said liquid.

8. In a shock absorbing device, the combination of substantially vertically arranged piston and cylinder units providing vertically spaced closed chambers, spring means urging said piston and cylinder relatively axially of one another, an apertured boss on the head of said piston extending upwardly therefrom, a one-way valve between said chambers associated with the aperture in said boss, a quantity of liquid in the lower of said chambers, and a conduit extending below the level of said liquid and affording communication between said chambers.

9. In a shock absorbing device, the combination of substantially vertically arranged piston and cylinder units providing vertically spaced closed chambers, spring means urging said piston and cylinder relatively axially of one another, an apertured boss on the head of said piston extending upwardly therefrom, a one-way valve between said chambers associated with the aperture in said boss, a quantity of liquid in the lower of said chambers, and a conduit extending below the level of said liquid and affording communication between said chambers in the opposite direction.

10. In a shock absorbing device, the combination of substantially vertically arranged piston and cylinder units providing vertically spaced closed chambers, spring means urging said piston and cylinder relatively axially of one another, an apertured boss on the head of said piston extending upwardly therefrom, a one-way valve between said chambers associated with the aperture in said boss, a quantity of liquid in the lower of said chambers, and a telescopic conduit comprising sections respectively carried by said piston and cylinder units, said conduit extending below the level of said liquid and affording communication between said chambers.

11. In a shock absorbing device, the combination of substantially vertically arranged piston and cylinder units providing vertically spaced closed chambers, spring means urging said piston and cylinder relatively axially of one another, an apertured boss on the head of said piston extending upwardly therefrom, a one-way valve between said chambers associated with the aperture in said boss, a quantity of liquid in the lower of said chambers, and a telescopic conduit comprising sections respectively carried by said piston and cylinder units, said conduit extending below the level of said liquid and affording communication between said chambers in the other direction only.

12. In a shock absorbing device, the combination of substantially vertically arranged piston and cylinder units providing vertically spaced closed compartments, spring means normally urging said piston and cylinder relatively axially of one another, the head of said piston provided with an opening extending between said compartments, a valve adapted to engage the head of said piston about said opening and obstruct fluid flow therethrough in one direction, a second valve adapted to obstruct fluid flow through said opening in the opposite direction upon predetermined relative movement between said piston and cylinder, and means providing restricted communication between said compartments in a direction opposite to that provided by said first-named valve.

13. In a shock absorbing device, the combination of substantially vertically arranged piston and cylinder units providing vertically spaced closed compartments, spring means normally urging said piston and cylinder relatively axially of one another, the head of said piston provided with an opening extending between said compartments, a valve adapted to engage the head of said piston about said opening and restrict fluid flow therethrough in one direction, a second valve adapted to obstruct fluid flow through said opening in the opposite direction upon predetermined relative movement between said piston and cylinder, and means providing restricted communication between said compartments in a direction opposite to that provided by said first-named valve.

14. In a shock absorbing device, the combination of substantially vertically arranged piston and cylinder units providing vertically spaced closed compartments, spring means normally urging said piston and cylinder relatively axially of one another, the head of said piston provided with an opening extending between said compartments, a valve adapted to engage the head of said piston about said opening and restrict fluid flow therethrough in one direction, a second valve adapted to restrict fluid flow through said opening in the opposite direction upon predetermined relative movement between said piston and cylinder, and means providing restricted communication between said compartments in a direction opposite to that provided by said first-named valve.

15. In a shock absorbing device, the combination of substantially vertically arranged piston and cylinder units providing vertically spaced closed compartments, spring means normally urging said piston and cylinder relatively axially of one another, the head of said piston provided with an opening extending between said compartments, a valve adapted to engage the head of said piston about said opening and obstruct fluid flow therethrough in one direction, a second valve adapted to obstruct fluid flow through said opening in the opposite direction upon predetermined relative movement between said piston and cylinder, a quantity of liquid in the lower of said compartments, and a conduit extending below the level of said liquid affording communication between said compartments in a direction opposite to that provided by said first named valve.

16. In a shock absorbing device, the combination of vertically arranged piston and cylinder units defining vertically spaced closed compartments, a spring between the head of said piston and the end of said cylinder resiliently urging such units axially apart, the central portion of the piston head provided with an apertured vertical extension, a check valve carried by the head of said piston closing the aperture therethrough against fluid flow in one direction, a valve member carried by said cylinder adapted to close the aperture in said piston as said piston head approaches the end of said cylinder, a quantity of liquid in one of said compartments, a conduit secured to the head of said piston extending therethrough and into said liquid, means defining an annular chamber about said piston and one-way valve means between said annular chamber and one of said first-named compartments.

17. In a shock absorbing device, the combination of a piston element which defines a closed fixed space, a cylinder element defining with the head of said piston element an adjustable closed space, spring means normally urging apart said piston and cylinder elements, a gas entrapped in said closed spaces, a valve in the head of said piston adapted to pass said gas quickly from said adjustable space to said fixed space and a passage-way in said piston head adapted to provide a restricted passage for said gas between said spaces.

18. In a shock absorbing device, the combination of a piston element which defines a closed fixed space, a cylinder element defining with the head of said piston element an adjustable closed space, spring means normally urging apart said piston and cylinder elements, a gas entrapped in said closed spaces, a valve in the head of said piston adapted to pass said gas quickly from said adjustable space to said fixed space and a passage-way in said piston head adapted to provide a restricted passage for said gas between said spaces, a liquid in said fixed space, and a conduit mounted through said piston head adapted to convey said liquid from said fixed space to said adjustable space.

19. In a shock absorbing device, the combination of a piston element which defines a closed fixed space, a cylinder element defining with the head of said piston element an adjustable closed space, spring means normally urging apart said piston and cylinder elements, a gas entrapped in said closed spaces, a valve in the head of said piston adapted to pass said gas quickly from said adjustable space to said fixed space and a passage-way in said piston head adapted to provide a restricted passage for said gas between said spaces, a liquid in said fixed space, a conduit mounted through said piston head adapted to convey said liquid from said fixed space to said adjustable space, and a conduit carried by said cylinder element and communicating with the space defined thereby near the top thereof, said last named conduit having a telescopic relation to said first named conduit.

20. In a shock absorbing device, the combination of a piston element which defines a closed fixed space, a cylinder element defining with the head of said piston element an adjustable closed space, spring means normally urging apart said piston and cylinder elements, a fluid entrapped in said closed spaces, a valve in the head of said piston adapted to pass said fluid quickly from said adjustable space to said fixed space and a passage-way in said piston head adapted to provide a restricted passage for said fluid between said spaces, a liquid in said fixed space, and a conduit mounted through said piston head adapted to convey said liquid from said fixed space to said adjustable space, said conduit having a one way valve by which said liquid enters said conduit.

21. In a shock absorbing device, the combination of a piston element which defines a closed fixed space, a cylinder element defining with the head of said piston element an adjustable closed space, spring means normally urging apart said piston and cylinder elements, a gas entrapped in said closed spaces, a valve in the head of said piston adapted to pass said gas quickly from said adjustable space to said fixed space and a passage-way in said piston head adapted to provide a restricted passage for said gas between said spaces, and valve means carried by said cylinder element adapted to cover and render inoperative said first recited valve when the adjustable space defined by said cylinder has been decreased to a predetermined extent.

THOMAS W. SLUTZ.